(12) United States Patent
Samejima et al.

(10) Patent No.: US 7,325,387 B2
(45) Date of Patent: Feb. 5, 2008

(54) RIDING-TYPE MOWER

(75) Inventors: Kazuo Samejima, Kaizuka (JP); Masato Asahara, Sakai (JP)

(73) Assignee: Kubota Corporation, Osaka (JP)

( * ) Notice: Subject to any disclaimer, the term of this patent is extended or adjusted under 35 U.S.C. 154(b) by 98 days.

(21) Appl. No.: 11/198,899

(22) Filed: Aug. 5, 2005

(65) Prior Publication Data
US 2006/0032205 A1    Feb. 16, 2006

(30) Foreign Application Priority Data
Aug. 9, 2004    (JP) ............................. 2004-232468

(51) Int. Cl.
*A01D 34/00*    (2006.01)
(52) U.S. Cl. ........................... 56/16.2; 56/14.9; 56/209
(58) Field of Classification Search .............. 56/15.8, 56/14.9, 15.3, 15.5, 15.7, 15.9, 16.3, 17.1, 56/17.2, 209, DIG. 3, DIG. 10, DIG. 14, 56/DIG. 22

See application file for complete search history.

(56) References Cited

U.S. PATENT DOCUMENTS 4,700,536 A * 10/1987 Torras ........................ 56/15.8
6,276,119 B1 * 8/2001 Oshima et al. ............... 56/17.1
6,857,254 B2 * 2/2005 Melone et al. ................ 56/15.8
6,877,302 B2 * 4/2005 Samejima et al. ......... 56/320.2

* cited by examiner

*Primary Examiner*—Thomas B. Will
*Assistant Examiner*—Mai T Nguyen
(74) *Attorney, Agent, or Firm*—The Webb Law Firm

(57) ABSTRACT

A riding-type mower includes a plurality of wheels, a body supported by the plurality of wheels, at least one draft link couplable at one end to the body, a pair of support links coupled at one end to the body and arranged rearwardly from the at least one draft link, and a mower unit whose front is supported from the body via the at least one draft link and whose rear is supported from the body by the pair of support links. The mower unit includes a mower deck having a front wall and a rear wall that extends substantially vertically, a plurality of blades housed in the mower deck each operable to rotate about a vertical axis, a balance arm coupled at two laterally spaced locations to the support links, and a shaft extending in a fore-and-aft direction and arranged at a position rearwardly of the rear wall of the mower deck within a vertical width of the rear wall, with the balance arm being swingably supported via the shaft about an axis of the shaft relative to the mower deck, such that the mower deck is rollably supported by the body about the axis of the shaft.

20 Claims, 8 Drawing Sheets

RIDING-TYPE MOWER

BACKGROUND OF THE INVENTION

1. Field of the Invention

The present invention relates to a riding-type mower that has a mower deck housing a plurality of blades. More specifically, the present invention relates to a riding-type mower having an improved device that supports the mower deck from a traveling body.

2. Related Art

A conventional riding-type mower is disclosed, for example, in Japanese Patent Application Publication No. 11-332346. This riding-type mower has a mower unit housing three laterally parallel blades rotationally driven about a vertical axis in a mower deck. The mower unit is liftably supported below a traveling body via draft links at the front and lift links at the rear. With this device, a balance arm is swingably provided about an axis extending in a fore-and-aft direction at a position on the rear upper surface of the mower deck, with left and right points of the balance arm being coupled to left and right lift links.

With a riding-type mower of the above structure, the mower unit is suspendingly supported to be rollable relative to the traveling body. Thus even if the traveling body inclines relative to the ground due to the wheels on one side sinking into the ground more than the wheels on the other side, the positioning of the mower unit which rolls relative to the traveling body is corrected to be parallel with the ground, enabling any difference in lateral cutting height to be suppressed. However, the introduction of the balance arm results in significant protrusion above the mower deck, restricting the amount of lift of the mower unit because of interference between the traveling body and the structure protruding above the mower deck.

There is a danger when the amount of lift of the mower unit is limited of undulations in the ground hitting the mower unit and the mower unit being damaged. Securing a large amount of lift of the mower unit is thus desired.

Particularly with a configuration in which the mower unit is driven by arranging a transmission shaft that spans from a mid PTO shaft provided at the lower rear of the traveling body to an input case on the upper surface of the mower deck of the mower unit, the transmission shaft relatively approaches the upper surface of the mower deck when the mower is lifted up. With the provision of the balance arm for supporting the mower unit as described above, the amount of lift of the mower unit is further constricted due to interference between this balance arm and the transmission shaft.

SUMMARY OF THE INVENTION

An object of the present invention is to provide a riding-type mower that secures a large amount of lift of a mower unit while enabling grass cutting to be performed at a uniform cutting height by introducing a balance arm to tiltably support the mower unit.

A riding-type mower according to the present invention includes a plurality of wheels, a body supported by the plurality of wheels, at least one draft link couplable at one end to the body, a pair of support links coupled at one end to the body and arranged rearwardly from the at least one draft link, and a mower unit whose front is supported from the body via the at least one draft link and whose rear is supported from the body by the pair of support links. The mower unit includes a mower deck having a front wall and a rear wall that extends substantially vertically, a plurality of blades housed in the mower deck each operable to rotate about a vertical axis, a balance arm coupled at two laterally spaced locations to the support links, and a shaft extending in a fore-and-aft direction and arranged at a position rearwardly of the rear wall of the mower deck within a vertical width of the rear wall, with the balance arm being swingably supported via the shaft about an axis of the shaft relative to the mower deck, such that the mower deck is rollably supported by the body about the axis of the shaft.

This structure enables the provision of a riding-type mower capable of securing a large amount of lift of the mower unit even when a balance arm is introduced.

BRIEF DESCRIPTION OF THE DRAWINGS

These and other objects, advantages, and features of the invention will become apparent from the following description thereof taken in conjunction with the accompanying drawings, which illustrate specific embodiments of the present invention.

In the drawings.

DETAILED DESCRIPTION OF PREFERRED EMBODIMENTS

A riding-type mower according to the present invention is described next with reference to the drawings. Throughout the specification and the claims, the term "fore-and-aft" is used to indicate the orientation along the front and back directions of the mower, with the front meaning the direction the operator faces when looking straight ahead in the operator's seat.

Figure 1:
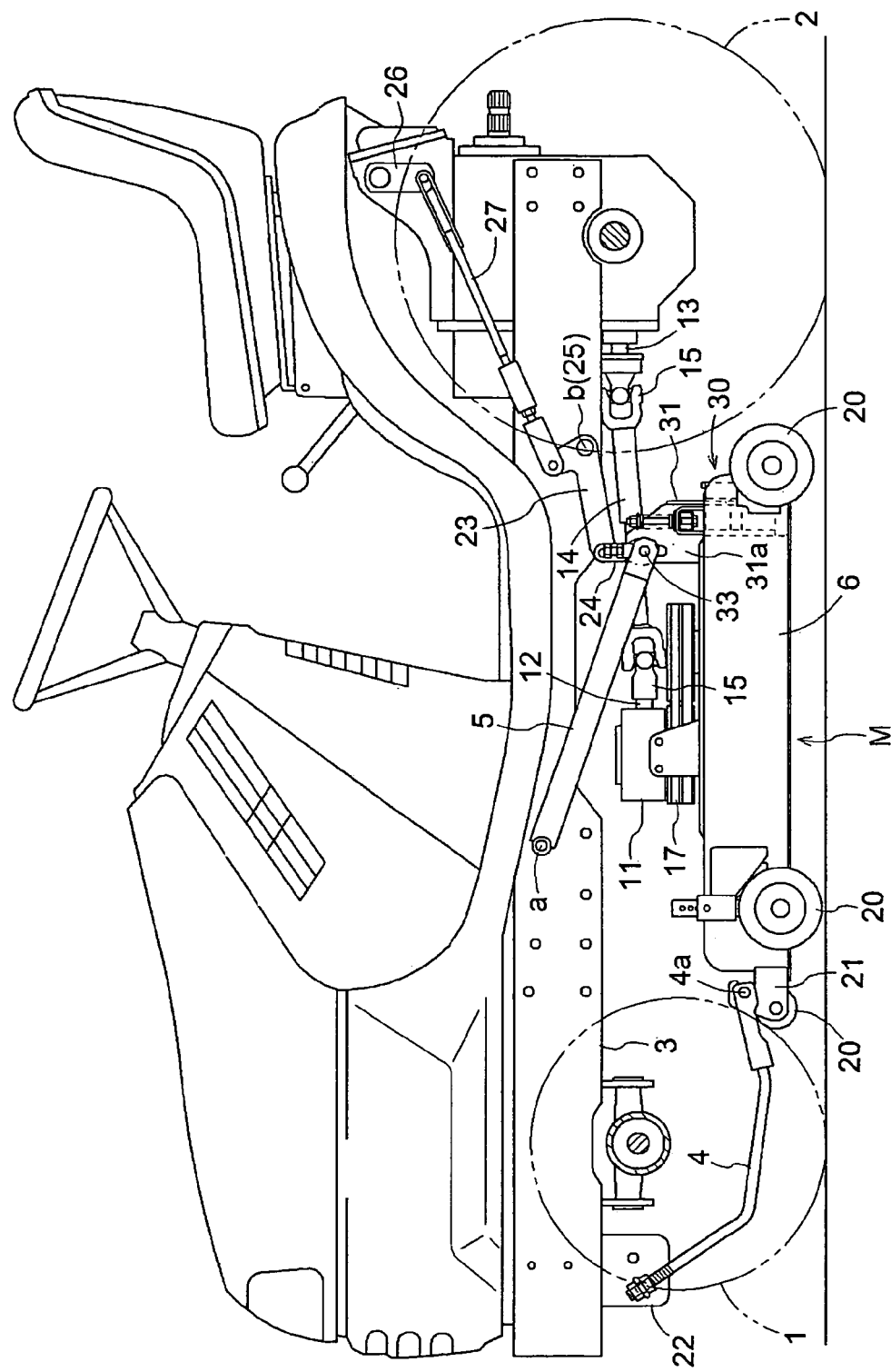
FIG. 1 is a side view showing a riding-type mower according to the present invention with a mower unit in a lowered state.

A side of the riding-type mower pertaining to the present invention is shown in FIG. 1. This riding-type mower is four-wheel drive with steerable front wheels 1 and fixed-direction rear wheels 2 each being driven. A mower unit M is suspended below a traveling body 3 of the riding-type mower via draft links 4 at the front and lift links 5 at the back such that the mower unit can be lifted to a transport position and lowered to an operating position. There are both suspension type and ground hugging type riding-type mowers, with the present invention being applicable to both types. Lift links 5 are thus also called support links 5.

Figure 2:
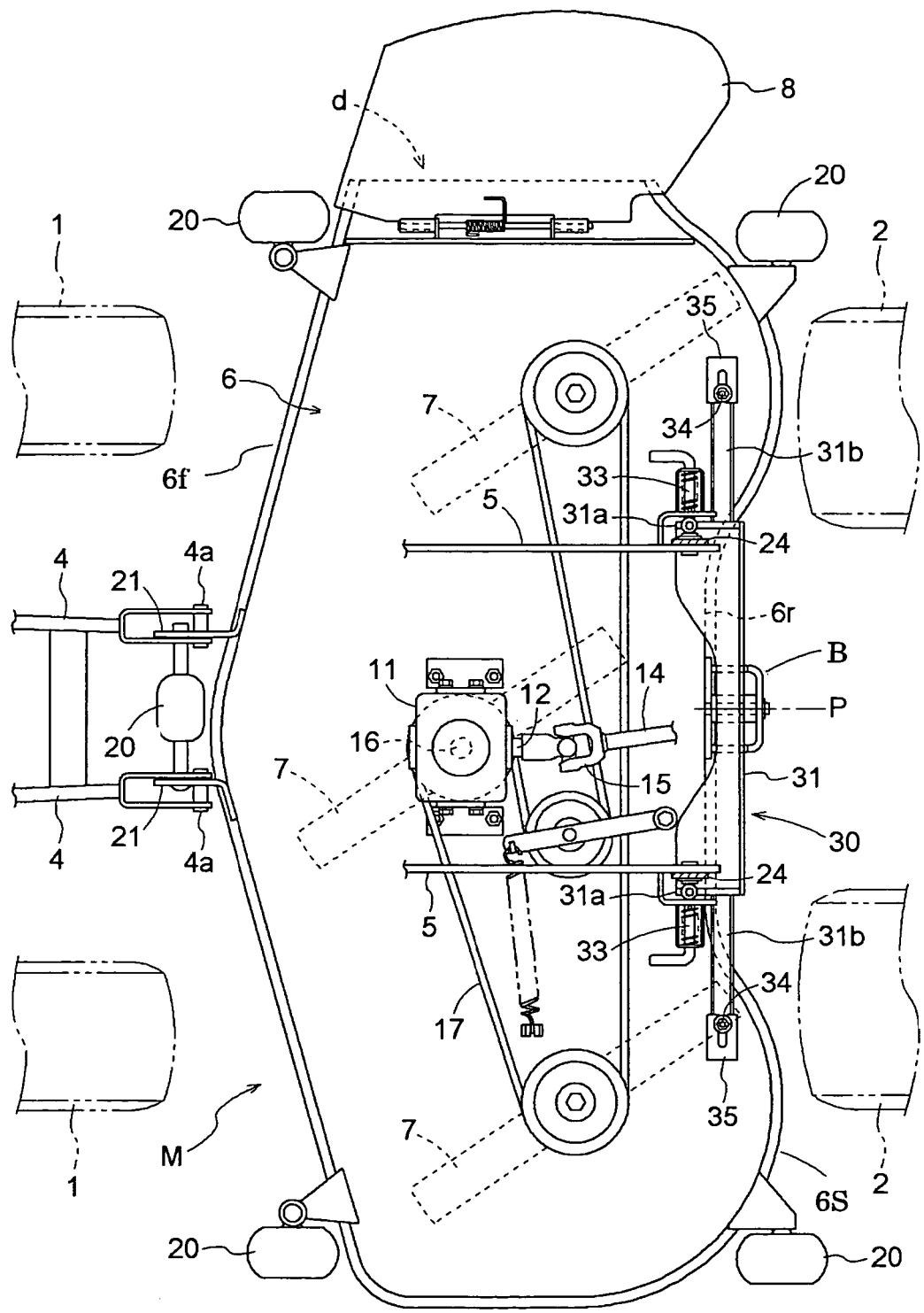
FIG. 2 is a plan view of the mower unit.

As shown in FIG. 2, with mower unit M, three blades 7 each rotationally driven in the same direction about a vertical axis are pivotally supported within a downwardly open mower deck 6 in a triangular arrangement with the central blade 7 displaced slightly forward. Cutting is performed without leaving uncut areas as a result of the rotational loci of the tips of blades 7 overlapping slightly.

Mower deck 6 has a front wall 6f and a rear wall 6r that extend substantially vertically, and is constituted from a flat mower deck that is vertically tall and whose upper surface is set to generally the same height, with a discharge chute d being formed at a right edge thereof. This example is a side discharge design, in which an anti-scatter side cover 8 is disposed over discharge chute d and cuttings discharged from discharge chute d are left at the side of the body.

Note that if necessary it is also possible to perform the grass cutting operation with a configuration in which a blower is attached to the right edge of mower deck 6 to transport cuttings discharged from discharge chute d rearwardly of the body with wind power using the blower and a duct, where the cuttings are fed into a grass catcher disposed at the rear of the body. Also, mulching can be performed by attaching a mulching baffle inside mower deck 6 to close off discharge chute d and form a mulching chamber for each of blades 7. Grass cuttings are repeatedly sectioned while being rotated around the mulching chambers, and then left on the swath.

An input case 11 is centrally provided on the upper surface of mower deck 6, with an input shaft 12 jutting out rearwardly from this input case 11 and a PTO shaft 13 jutting out forwardly from the lower rear of traveling body 3 being drivingly coupled via transmission shaft 14 and a universal joint 15. Rotational power converted to vertical axis rotation by a bevel gear (not depicted) in the input case is transmitted to a rotation shaft 16 of the central blade 7, which is connected with the rotation shafts 16 of the side blades 7 by a belt 17, and all of the rotational blades 7 are rotationally driven in the same direction (clockwise when viewed from above) at a uniform speed, so that the first half of the rotation locus of each blade 7 is oriented toward discharge chute d.

Anti-scalp rollers 20 for negotiating obstacles are disposed around mower deck 6. When mower unit M suspendingly supported with accommodation for upward movement approaches an incline or undulation etc. in the ground, mower unit M is lifted relatively upward due to one or more of anti-scalp rollers 20 riding up the undulation etc., thereby avoiding mower deck 6 directly contacting with and shaving the ground.

Mower unit M, to achieve uniformity of cutting height, is tiltably supported relative to traveling body 3. The support structure of mower unit M is described in detail below.

A left/right pair of coupling hooks 21 jut out from a central region of the front end of mower unit M. The front of mower deck 6 is supported by seizing coupling pins 4a provided at the rear end of draft links 4 to coupling hooks 21, and coupling the front end of draft links 4 to a coupling bracket 22 provided below the front end of traveling body 3. It is not necessary to provide two draft links 4, with the provision of only one draft link being acceptable.

Left/right lift links 5 pivot at the front end on a fulcrum a provided on traveling body 3, while being respectively suspendedly coupled at the rear end thereof via connecting links 24 to left/right lift arms 23 vertically swingably mounted at the rear of traveling body 3 about a fulcrum b. Left/right lift arms 23 swing as one via a spindle 25, with one of lift arms 23 being drivingly coupled via a rod 27 to a hydraulically-operated drive arm 26 disposed at the upper rear of the body. Left/right lift arms 23 swing upwardly as one due to drive arm 26 swinging anti-clockwise in the diagram so that mower unit M is lifted up.

Figure 8:
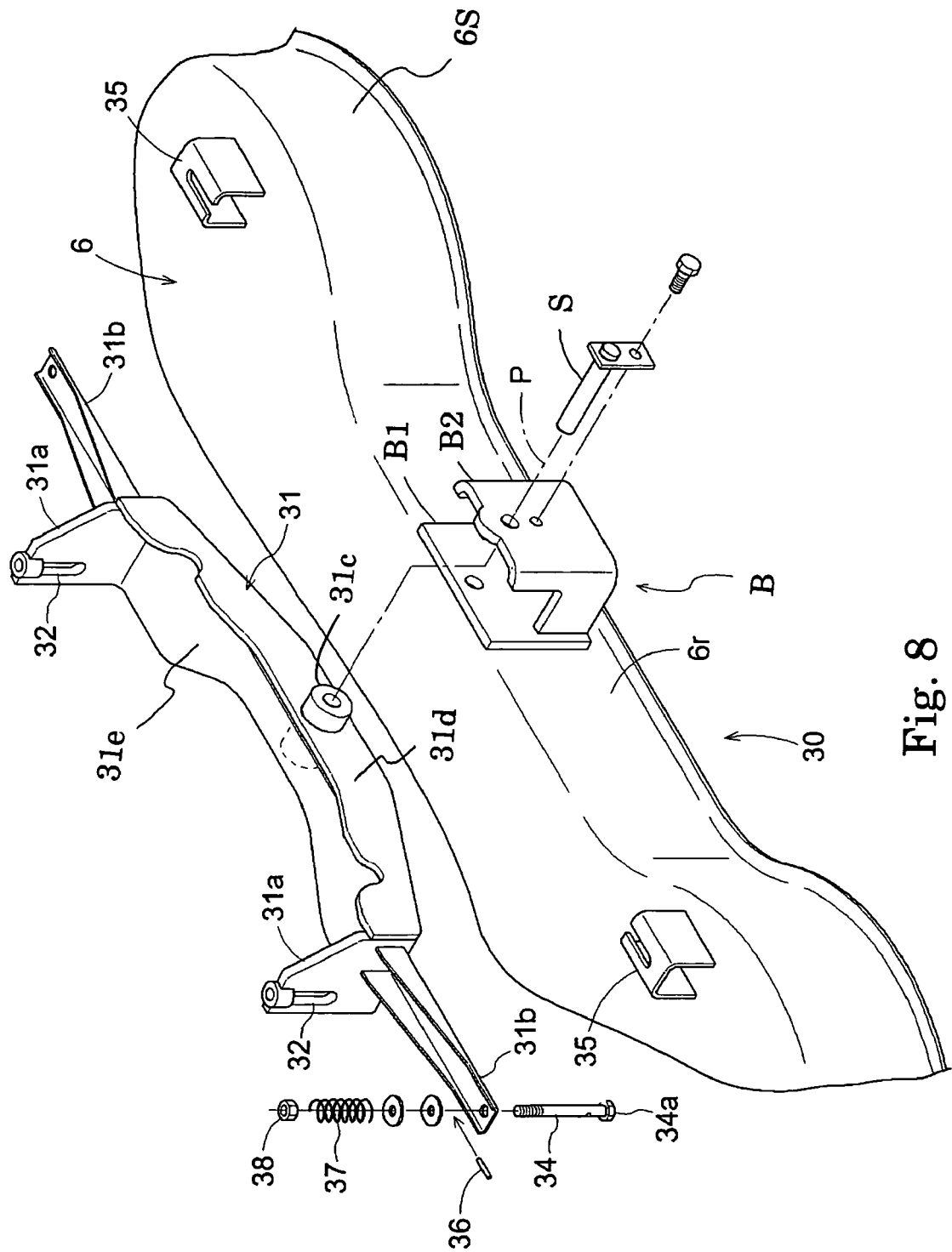
FIG. 8 is an exploded perspective view of balance arm fittings.

As shown in FIGS. 2 and 8, a central portion of rear wall 6r of mower deck 6 is formed into a recess 30 aligned with the triangular arrangement of blades 7. A balance arm 31 is attached to the mower deck's rear wall 6r in this recess 30 to be swingable on an axis P of a shaft S that is extending in a fore-and-aft direction of the mower and that is located at a position lower than the mower deck's upper surface. Shaft S passes through the front B1 of a bracket B having a hole and being fixed to rear wall 6r of mower deck 6, and passes through and is fixed to the rear B2 having a hole and being spaced rearwardly from the front. Shaft S is bolted to the rear B2 of bracket B. The front B1 and the rear B2 having surfaces extending substantially vertically. The rear B2 of the bracket is positioned forwardly of portions 6s projecting at the very rear of mower deck 6.

Figure 3:
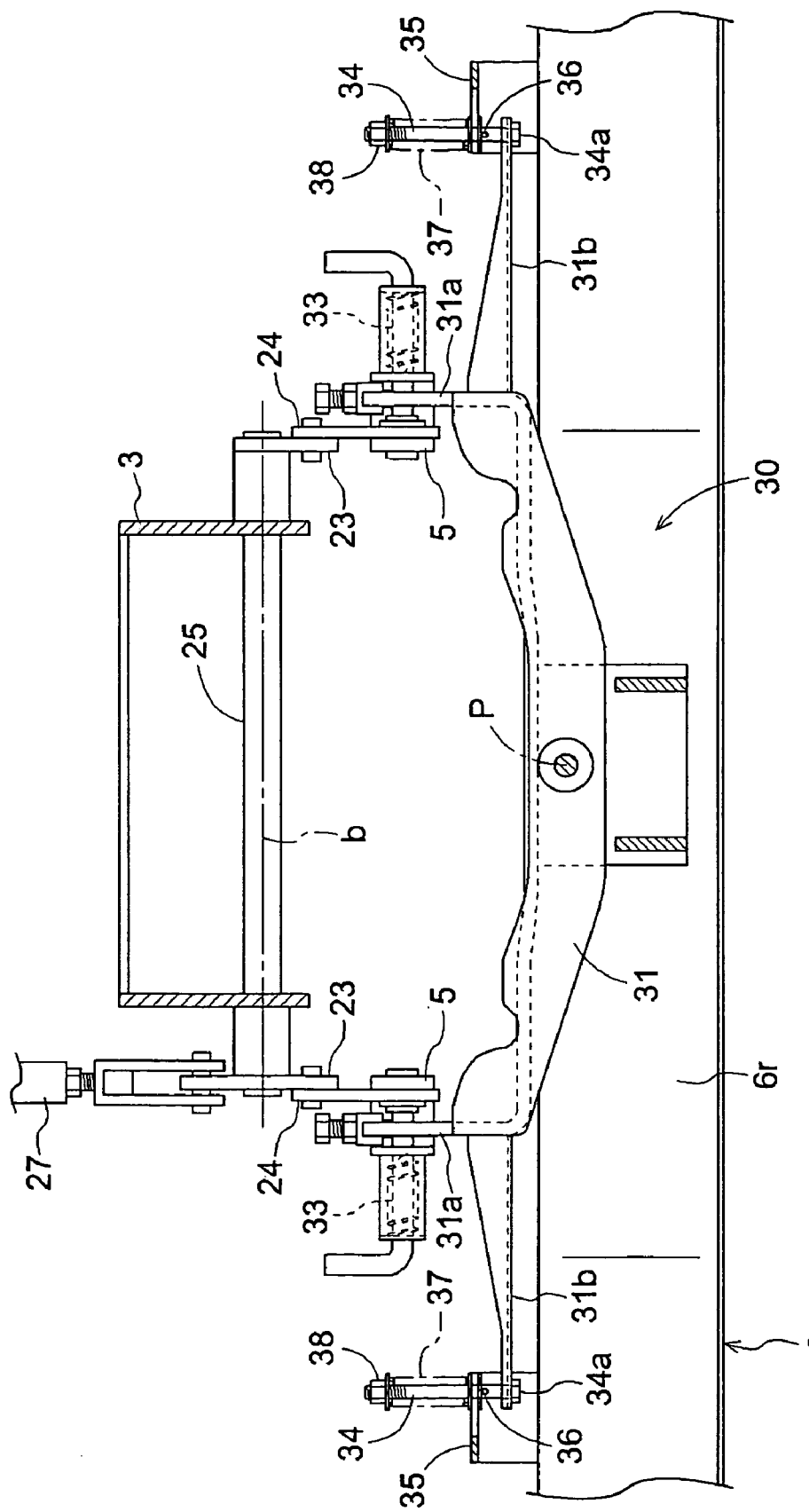
FIG. 3 is a back view showing a central vicinity of the lowered mower unit.
Figure 4:
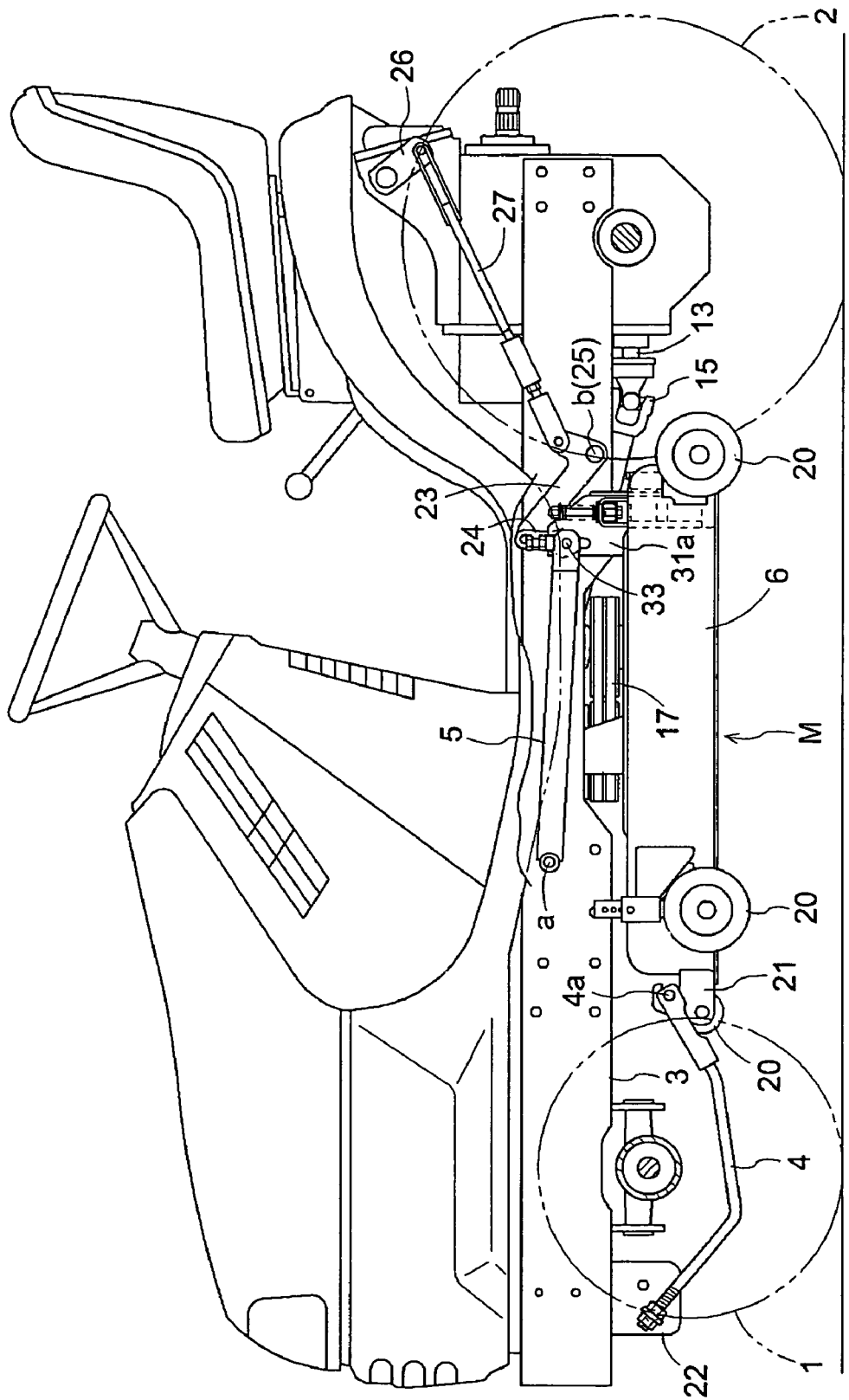
FIG. 4 is a side view showing the riding-type mower with the mower unit in a raised state.
Figure 5:
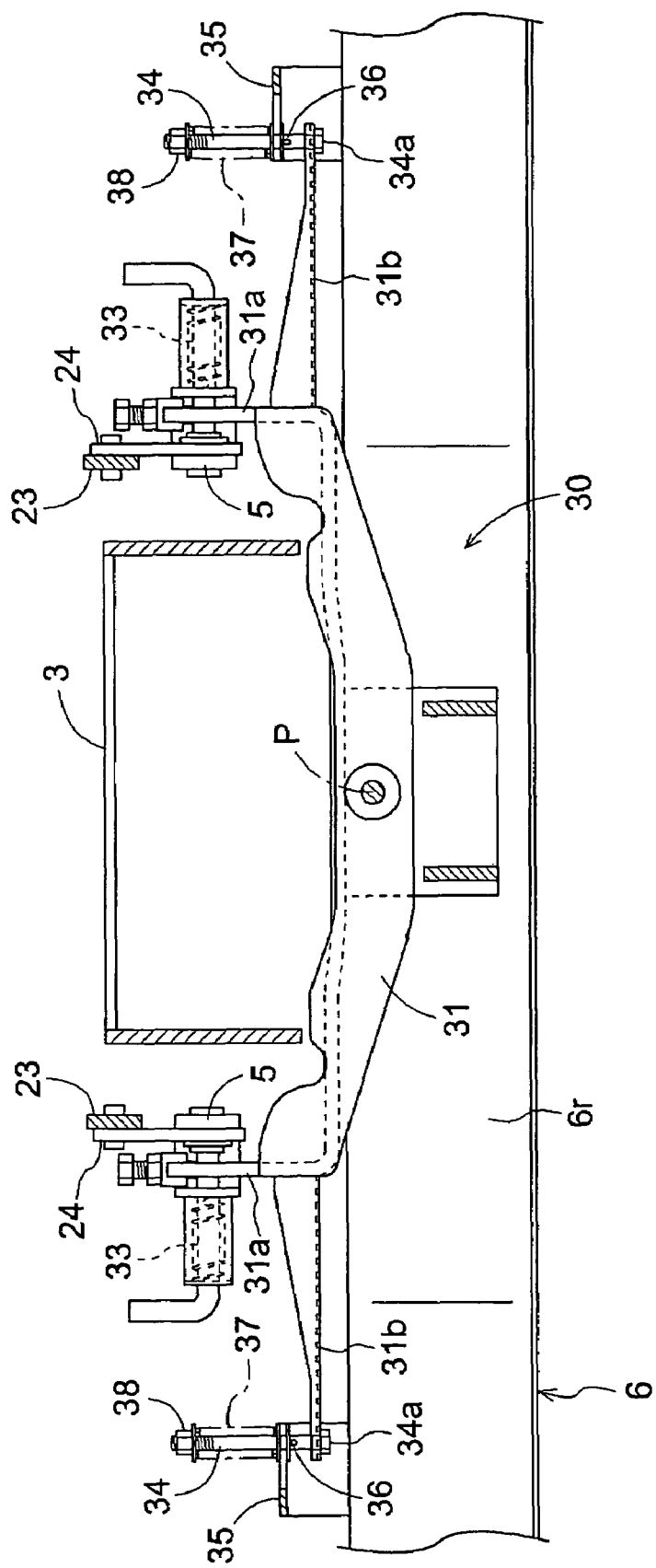
FIG. 5 is a back view showing a central vicinity of the raised mower unit.
Figure 6:
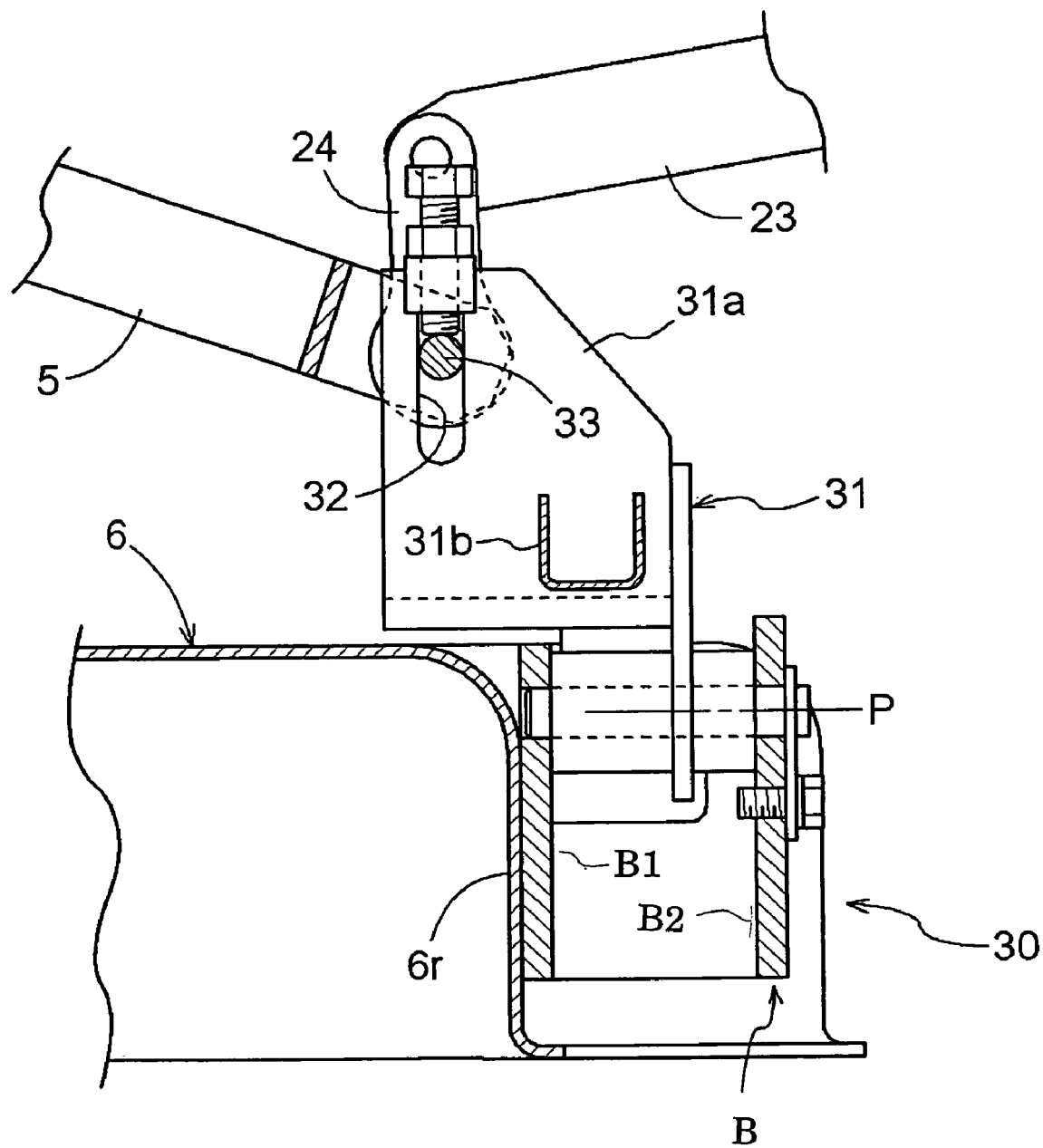
FIG. 6 is a side profile view of the rear of the mower unit.
Figure 7:
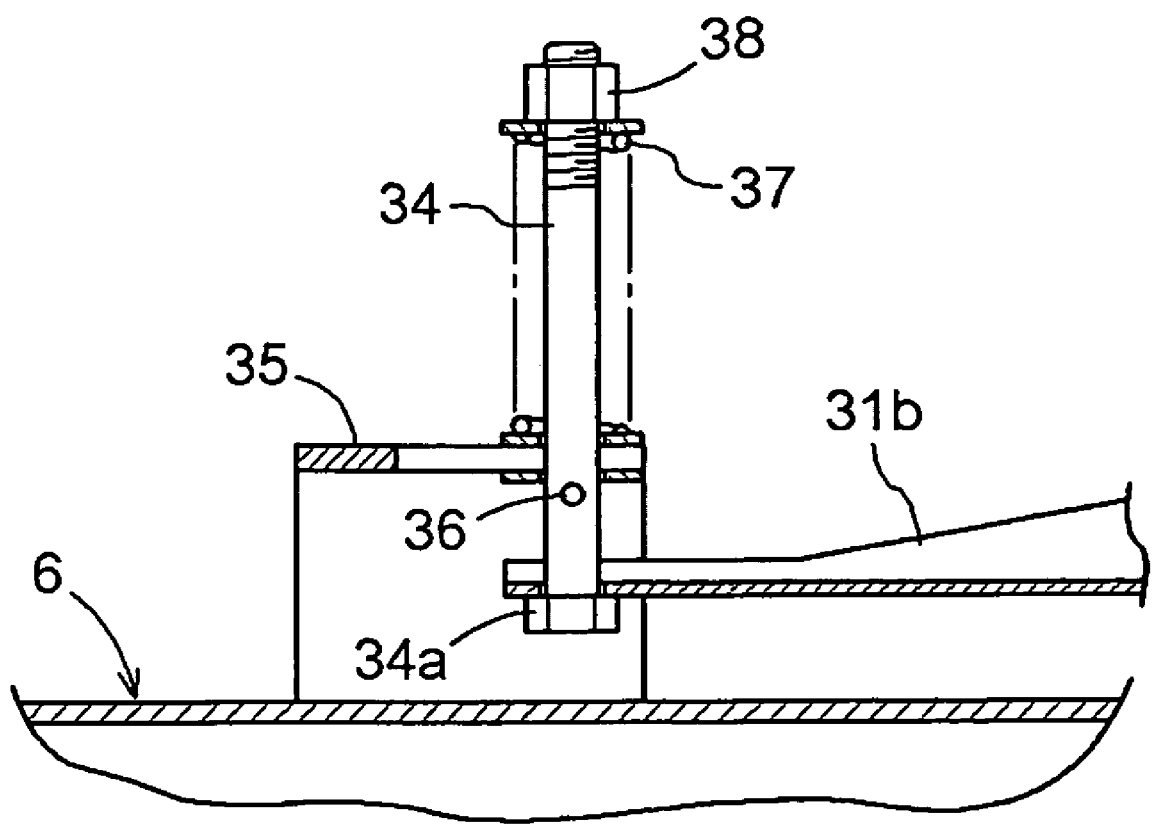
FIG. 7 is a back profile view showing a linking part of the mower unit and an end of the balance arm.

As shown in FIGS. 3 and 6, balance arm 31 has a length projecting greatly to the left and right of traveling body 3, with a left/right pair of coupling pieces 31a being provided at intermediate points between fulcrum P and the left/right tips so as to extend vertically. As most clearly shown in FIG. 8, balance arm 31 has a plate member 31d extending laterally and vertically, and a front member 31e extending horizontally forwardly from plate member 31d and forming coupling pieces 31a. A boss 31c forming a hole through which shaft S passes is provided at the center of plate member 31d. It is also possible to make mower deck 6 swingable about shaft S by fixing shaft S to balance arm 31 and swingably supporting the shaft relative to bracket B.

Vertically extending long holes 32 are formed in coupling pieces 31a, with a nut being fixed at the top of each long hole 32 and adjusting nuts being screwed into these nuts. Spring energized L-shaped pins are inserted into long holes 32 to couple coupling pieces 31a to the free end of lift links 5.

The lateral ends of balance arm 31 both extend above mower deck 6 in areas beyond recess 30, with support rods 34 having major diameter heads 34a that stoppingly support balance arm 31 from below being vertically through mounted to the tips of extending parts 31b, and each support rod 34 passing through a fastener 35 provided on the left and right of the mower deck's upper surface.

Pins 36 are mounted in a region of support rods 34 below fasteners 35, while coil springs 37 (resilient members) are fitted in an insertion region above fasteners 35, with nuts 38 being arranged thereon. Support rods 34 are thus retained in a state of being upwardly energized by the restoring force resulting from the initial compression of coil springs 37 with upward displacement impossible. The mower deck is energized by these coil springs 37 such that an imaginary straight line connecting the two laterally spaced coupling points of lift links 5 of balance arm 31 is approximately parallel with the mower deck's upper surface. In a normal state, mower deck 6 and balance arm 31 are retained in a prescribed position parallel to each other as a result of major diameter heads 34a of right/left support rods 34 stopping both ends of balance arm 31 from below, and when the weight balance around fulcrum 6 collapses mower deck 6 tilts laterally against coil springs 37 relative to balance arm 31. Note that the tilting characteristics of mower deck 6 can altered by adjusting the amount by which coil springs 37 are tightened down by nuts 38 to adjust the initial energizing force of support rods 34.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A riding-type mower comprising:
a plurality of wheels;
a body supported by the plurality of wheels;
at least one draft link couplable at one end to the body;
a pair of support links coupled at one end to the body and arranged rearwardly from the at least one draft link; and
a mower unit whose front is supported from the body via the at least one draft link, and whose rear is supported from the body by the pair of support links, the mower unit includes:
a mower deck having a front wall and a rear wall that extends substantially vertically;
a plurality of blades housed in the mower deck each operable to rotate about a vertical axis;
a balance arm coupled at two laterally spaced locations to the support links; and
a shaft extending in a fore-and-aft direction and arranged at a position rearwardly of the rear wall of the mower deck within a vertical width of the rear wall, the balance arm being swingably supported via the shaft about an axis of the shaft relative to the mower deck, whereby the mower deck is rollably supported by the body about the axis of the shaft.

2. The riding-type mower of claim 1 further comprising:
resilient members provided between the mower deck and the balance arm to apply urging force to the mower deck such that an imaginary straight line connecting the two laterally spaced locations is approximately parallel with the mower deck.

3. The riding-type mower of claim 1, wherein the shaft is fixed to the rear wall of the mower deck.

4. The riding-type mower of claim 1, wherein the mower deck houses three blades, a central blade of which is positioned forwardly with respect to side blades thereof.

5. The riding-type mower of claim 1, wherein the mower deck has a recess formed by a central portion of the rear wall of the mower deck being forwardly displaced, with the shaft being arranged within a vertical width of the rear wall at a position in the recess rearwardly of the rear wall.

6. The riding-type mower of claim 1, wherein at least a central portion of the balance arm is positioned lower than an upper surface of the mower deck.

7. The riding-type mower of claim 1, wherein the balance arm has a vertical surface extending laterally, and a boss fixed to the vertical surface and forming a hole through which the shaft passes.

8. The riding-type mower of claim 7, wherein the balance arm has a central part extending generally horizontally fixed to the vertical surface.

9. The riding-type mower of claim 8, wherein the central part is positioned higher than the boss.

10. The riding-type mower of claim 1, wherein coupling pieces coupled to the support links are fixed to the two laterally spaced locations of the balance arm.

11. The riding-type mower of claim 1, wherein the shaft is fixed to the mower deck via a bracket whose front is fixed to the mower deck and whose rear is spaced rearwardly from the front.

12. The riding-type mower of claim 11, wherein the rear of the bracket is positioned forwardly of a most rearwardly projecting portion of the mower deck.

13. A riding-type mower comprising:
a plurality of wheels;
a body supported by the plurality of wheels;
at least one draft link couplable at one end to the body;
a pair of support links coupled at one end to the body and arranged rearwardly from the at least one draft link; and
a mower unit whose front is supported from the body via the at least one draft link, and whose rear is supported from the body by the pair of support links, wherein the mower unit includes:
a mower deck;
three blades positioned adjacent one another and housed in the mower deck with each blade being operable to rotate about a vertical axis, a central blade of which is positioned forwardly with respect to side blades thereof; and
a shaft extending in a fore-and-aft direction and fixed to a vertical wall of the mower deck at a position lower than an upper surface of the mower deck; and
a balance arm coupled at laterally spaced locations to the pair of support links and swingable about the shaft, the mower deck being suspended from the body via the balance arm and the support links, such that the mower deck is rollable about the shaft.

14. The riding-type mower of claim 13, wherein the mower deck has a recess formed by a central portion of the rear wall being forwardly displaced and wherein the vertical wall to which the shaft is fixed is a rear wall in the recess.

15. The riding-type mower of claim 13, wherein at least a central portion of the balance arm is positioned lower than the upper surface.

16. The riding-type mower of claim 13, wherein the balance arm has a vertical surface extending laterally, and a boss fixed to the vertical surface and forming a hole through which the shaft passes.

17. The riding-type mower of claim 16, wherein the balance arm has a central part extending generally horizontally fixed to the vertical surface.

18. The riding-type mower of claim 17, wherein the central part is positioned higher than the boss.

19. The riding-type mower of claim 13, wherein coupling pieces coupled to the support links are fixed to both ends of the balance arm.

20. The riding-type mower of claim 1, wherein the mower unit is a suspension type.

* * * * *